No. 855,230. PATENTED MAY 28, 1907.
J. W. COLLINS.
ANIMAL TRAP.
APPLICATION FILED SEPT. 4, 1906.
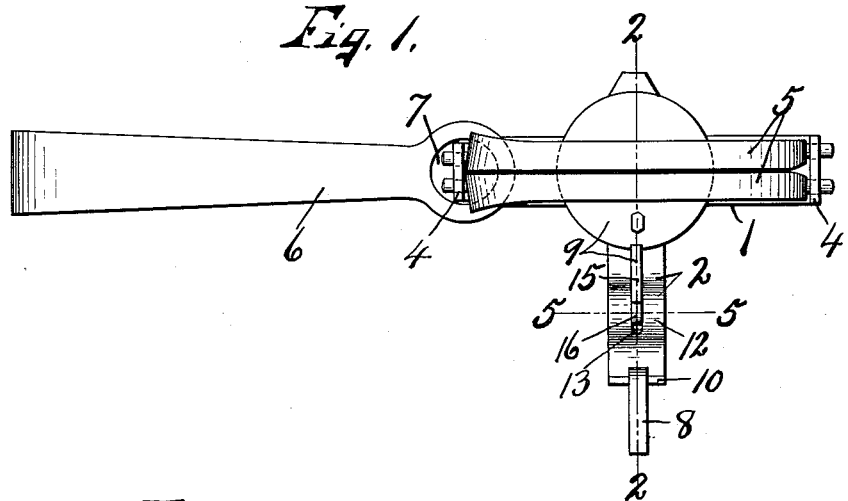
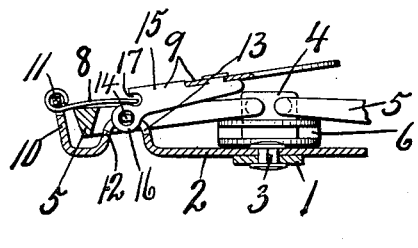
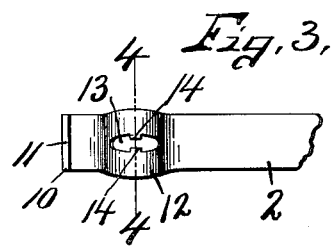
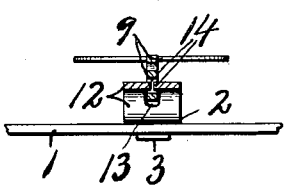
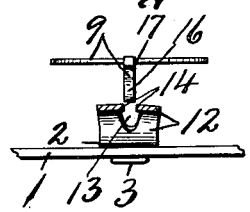
WITNESSES:
A. C. Thomas.
H. E. Chase.
INVENTOR:
Jerry W. Collins.
BY
Howard P. Denison
ATTORNEY.

UNITED STATES PATENT OFFICE.

JEREMIAH W. COLLINS, OF SHERRILL, NEW YORK, ASSIGNOR TO ONEIDA COMMUNITY, LIMITED, OF KENWOOD, NEW YORK, A CORPORATION OF NEW YORK.

ANIMAL-TRAP.

No. 855,230.  Specification of Letters Patent.  Patented May 28, 1907.

Application filed September 4, 1906. Serial No. 333,280.

*To all whom it may concern:*

Be it known that I, JEREMIAH W. COLLINS, of Sherrill, in the county of Oneida, in the State of New York, have invented new and useful Improvements in Animal-Traps, of which the following, taken in connection with the accompanying drawings, is a full, clear, and exact description.

This invention relates to certain improvements in animal traps, and refers more particularly to the means for attaching the tang of the platform to the frame.

Heretofore in this class of traps it has been customary to pivot the tang of the platform upon a post which is riveted at its lower end to the frame, making a jointed connection upon which there is always considerable leverage strain tending to loosen the joint or rivet connection.

The object of my present invention is to overcome this objectionable weakness in the trap by mounting the tang directly upon a raised portion of the frame so that the part to which the tang is pivoted is an integral part of the frame instead of a separate post riveted thereto.

A further object is to reduce the number of pieces and cost of manufacture, and at the same time produce a more permanent and rigid fulcrum for the platform.

Other objects and uses will be brought out in the following description.

In the drawings—Figure 1 is a top plan of an animal trap embodying my improvements. Fig. 2 is a sectional view taken on line 2—2, Fig. 1. Fig. 3 is a top plan of a portion of the frame having the fulcrum for the platform, the pintles being shown as separated to receive between them the tang of said platform. Fig. 4 is a sectional view taken on line 4—4, Fig. 3, showing the tang as about to be inserted between the pintles. Fig. 5 is a sectional view taken on line 5—5, Fig. 1, showing the pintles of the fulcrum as drawn together into the aperture of the tang.

The main supporting frame of this trap comprises a lengthwise bar —1— and a cross-bar —2— which is rigidly secured to the lengthwise bar by suitable fastening means, as a rivet —3—, Fig. 2. The lengthwise bar is provided with upturned ears —4— in which is journaled a pair of jaws —5—. These jaws are closed by a suitable retracting spring —6— having its ends provided with apertures —7— for receiving one end of the jaws —5— and the adjacent upturned ear —4— of the bar —1—.

The jaws —5— are re-opened in the usual manner by compressing the adjacent end of the spring —6— below the pivotal axes of the jaws, whereupon said jaws may be swung back and retained in their open position by a detent —8— and swinging platform —9— engaged therewith.

The outer end of the cross-bar —2— is turned upwardly forming a flange —10— which is slotted near its upper end, forming a pivotal bar —11— for the tongue or detent —8—.

A portion of the bar between the flange 10— and lengthwise bar —1— is pressed or stamped upwardly forming a loop —12— which is slotted lengthwise and is provided with opposed pintles —14— forming a fulcrum for the shank, as 15—, of the platform —9—.

The portions of the loop at the opposite sides of the slot —13—, and also the pintles 14— are primarily spread apart a sufficient distance to receive between said pintles an eye —16— on the end of the tang, the portions of the loop at opposite sides of the slot, afterward being drawn together or compressed causing the pintles 14— to enter opposite sides of the eye —16— and to form a fulcrum upon which the platform may swing. By this arrangement the fulcrum for the platform is not only materially stiffened, but does away with an extra piece and the work of riveting it to the cross-bar, and also maintains a fixed relation between the fulcrums of the platform and that of the detent because both are formed on the same piece of metal, as the cross-bar —2—.

The tang 15— is formed with the usual notch —17— into which the adjacent end of the detent —8— engages and operates through the medium of the spring-actuated jaw —5— engaged therewith to retain the platform in its adjusted position when the trap is set.

The spring pressure upon the detent —8— causes the latter to produce a lifting strain upon the heel of the tang —15— directly above the pintles —14—. It will be seen, however, that these pintles are braced forwardly and rearwardly of the vertical line of the lifting strain, and is therefore, better adapted to resist vertical, transverse and horizontal, or twisting strains than would be possible with a separate piece riveted to the part —2—.

The slot 13— is originally made of sufficient width to permit the eye —16— of the tang 15— to be inserted between the pintles 14—, whereupon the portions of the loop at the opposite sides of the slot are drawn together to cause the pintles to enter the eye —16—, thereby locking the platform tang to the loop to swing vertically.

The essential feature of my invention, therefore, consists in pressing or stamping a portion of the cross-bar —2— upwardly to form a loop, and to provide said loop with a longitudinal slot and pintles adapted to enter the eye of the tang of the platform to form a pivotal support for said platform integral with the cross-bar, thereby obviating the necessity for an extra piece, and the objectionable joint or rivet connection necessary to rigidly connect said piece to the cross-bar.

What I claim:

1. In an animal trap, a frame having a portion thereof pressed or stamped upwardly to form a loop, said loop having a lengthwise slot and pintles projecting across the slot, and a platform having an eye receiving said pintles.

2. In an animal trap of the class described, a supporting frame having a cross-bar, a portion of said cross-bar being pressed upwardly forming a loop, the closed side of the loop being slotted and provided with pintles on opposite sides of the slot, and a platform tang having an eye inserted in said slot and receiving said pintles.

3. In an animal trap of the class described, a jaw supporting frame having a laterally extending arm terminating at one end in an upturned flange and formed with a slotted loop near the flange, the opposite sides of the slot of said loop being formed with pintles, a tongue pivoted on the flange and a platform tang having an eye receiving said pintles, and also formed with a notch receiving the tongue.

4. A platform support for animal traps consisting of a bar of metal having a portion thereof bent in the form of a loop and slotted, portions of the loop at opposite sides of the slot being formed with inturned pintles and capable of being sprung apart or drawn together to vary the distance between the meeting ends of the pintles, and a platform having an eye inserted in said slot.

In witness whereof I have hereunto set my hand this 25th day of August 1906.

JERREY W. COLLINS.

Witnesses:
CLAUDE E. MARBLE,
NORLIN E. KINSLEIGH.